United States Patent
Holster

Patent Number: 5,398,911
Date of Patent: Mar. 21, 1995

[54] WINCH ASSEMBLY

[75] Inventor: Donald J. Holster, North Rocks, Australia

[73] Assignee: Pace Engineering Pty. Limited, Somersby, Australia

[21] Appl. No.: 975,379

[22] Filed: Nov. 16, 1992

[30] Foreign Application Priority Data

Nov. 15, 1991 [AU] Australia ............... PK9514

[51] Int. Cl.$^6$ ............ B66D 1/48; B66D 1/14; B60K 41/24; F16D 41/04
[52] U.S. Cl. .............................. 254/267; 254/348; 254/349; 254/350; 254/356; 254/362; 254/367; 192/12 B; 192/48.92
[58] Field of Search ............... 254/267, 272, 273, 274, 254/275, 348, 349, 350, 356, 362, 366, 367, 375; 192/12 B, 48.3, 48.4, 48.8, 48.92, 12 C, 12 D

[56] References Cited

U.S. PATENT DOCUMENTS

| | | | |
|---|---|---|---|
| 2,250,985 | 7/1941 | Benson | 254/275 |
| 2,335,079 | 11/1943 | Patterson | 254/275 |
| 4,128,164 | 12/1978 | Sandberg | 198/813 |
| 4,284,192 | 8/1981 | Taylor | 198/813 |

Primary Examiner—Daniel P. Stodola
Assistant Examiner—Michael R. Mansen
Attorney, Agent, or Firm—Fisher & Associates

[57] ABSTRACT

A winch assembly (10) includes a first transmission assembly rotatably connecting a motor (11) to a winch drum (20) comprising clutches (12, 16) adapted to rotatably engage an output shaft (13) of the motor (11) to a winch drum shaft (19) of the winch drum (20) to wind in cable (22) onto the winch drum (20) and to payout cable (22) from the winch drum (20) by disengagement of motor drive shaft (13) from winch drum shaft (19).

The winch assembly (10) further includes a second transmission assembly comprising an overrun clutch (23) rotatably connecting winch drum shaft (19) to motor drive shaft (13) if and when the payout speed of cable (22) from drum (20) exceeds a predetermined value.

The winch assembly (10) is particularly suited to control conveyor belt tension in relatively large conveyor belts by simple on/off control of the clutches (12, 16) in response to sensed conveyor belt tension.

11 Claims, 3 Drawing Sheets

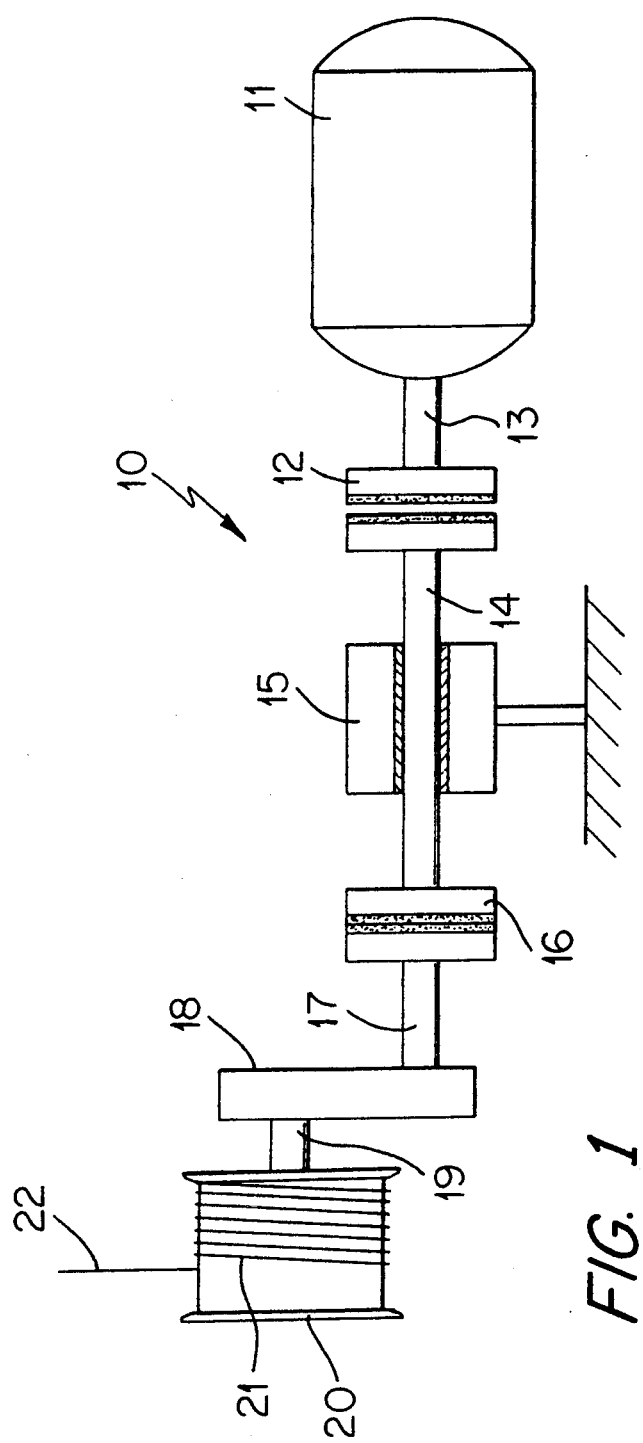
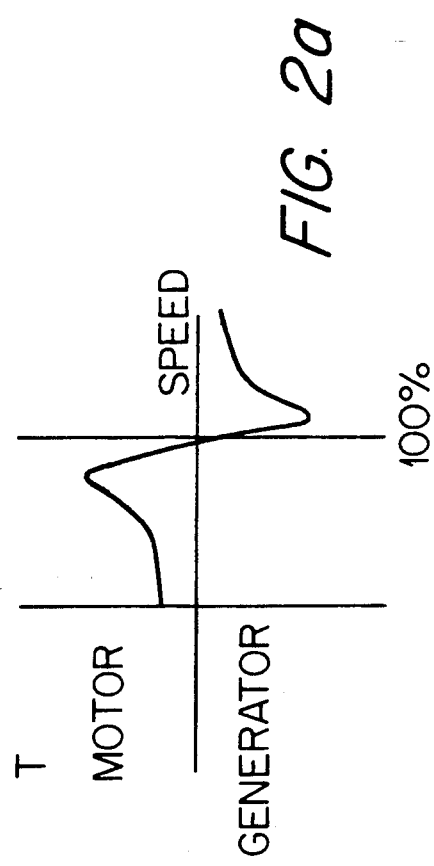
FIG. 1
FIG. 2a

WINCH ASSEMBLY

FIELD OF THE INVENTION

The present invention relates to a winch assembly and particularly to a winch assembly where a cable is wound upon a winch drum to a desired tension.

BACKGROUND ART

There are many kinds of winches for a wide variety of tasks. Among the more common kinds of winches used in industry are fixed speed reversing motor winches, hydraulic winches and eddy-current coupling winches, each of which suffer from various disadvantages.

For instance, fixed speed reversing motor winches do not allow quick and sensitive control over the cable winding operation because of the delay in the motor start-up time.

Hydraulic winches suffer from the well known operational inefficiency inherent in any hydraulically operated machinery and the requirement to continuously maintain the hoses and other componentry of the sometimes rather complex hydraulic system.

Eddy-current coupling winches are highly inefficient because of their inherent characteristic of constantly operating at 100% inefficiency. Furthermore, the eddy current coupling that drives such winches has high rotational inertia which slows the winch operating response. The eddy-current coupling componentry of such winches are also difficult to make flameproof and develop a large amount of heat during operation which may make them dangerous to use in coal mines and the like.

DISCLOSURE OF THE INVENTION

It is an object of the present invention to overcome or substantially ameliorate the disadvantages of the prior art.

According to the invention, there is provided a winch assembly comprising:

a winch drum adapted to reel in cable therearound so that an unwound portion of said cable is at a desired tension, and to pay out said cable when the said unwound portion is above the desired tension, drive means for rotatably urging said drum, said drive means including, in series, a motor rotatably connected to a first clutch which is adapted to be engaged for reeling in said cable, said first clutch being rotatably connected to a constantly engaged one-way clutch or brake, said one-way brake allowing reeling in said cable and being rotatably connected to a second clutch which is adapted to be disengaged for paying out said cable, said second clutch being rotatably connected to said winch drum, tension control means adapted to monitor the tension in the unwound portion of said cable and, when it monitors a tension below the desired tension, to cause the engagement of the first clutch so that the drive means rotatably urges said drum for reeling in said cable to the desired tension and, if it monitors a tension above the desired tension, to cause the disengagement of the second clutch for paying out said cable to the desired tension.

Preferably, the first clutch may be hydraulically, electrically or pneumatically engaged and is disengaged by a spring release mechanism.

Preferably, the constantly engaged one-way brake is self actuating and may comprise a sprag type brake, a ramp and roller type brake or a cam brake.

Preferably, the second clutch is engaged by a spring engaging mechanism and may be hydraulically, electrically or pneumatically disengaged.

Optionally, the tension control means may monitor the tension in the unwound portion of the cable either directly or indirectly.

Preferably, the tension control means comprises an electronically operated controller that includes an electronic sensor for monitoring cable tension, a programmable data reference bank for comparing the monitored tension with the desired tension, and electronically driven actuators for causing the engagement and disengagement of both the first and second clutches at the appropriate periods in the winching operation.

In yet a further broad form of the invention there is provided a conveyer belt tension control mechanism comprising a motor having an output shaft selectively, rotatably connected by first transmission means to a belt tensioner means adapted to increase tension in a conveyer belt by movement of said means in a first direction and reduce tension in said conveyer belt by movement of said means in a second direction; said motor output shaft running continuously in one direction during all operating phases of said conveyor belt tension control mechanism.

Preferably, said first transmission means comprises means for selectively engaging and disengaging said output shaft from said belt tensioner means and means for locking said belt tensioner means at a selected tension position.

Preferably, said first transmission means comprises, in series, a first clutch rotatably connected to said output shaft, said first clutch being rotatably connected to a constantly engaged one way brake, said one way brake being rotatably connected to a second clutch, said second clutch being rotatably connected to said belt tensioner means.

Preferably, said first clutch is normally disengaged, said second clutch is normally engaged and said one way brake comprises said means for locking said belt tensioner means.

Preferably, said mechanism further includes second transmission means operating mechanically in parallel with said first transmission means, said second transmission means adapted to selectively, rotatably engage said belt tensioner means with said output shaft under overrun conditions of said belt tensioner means whereby said motor acts to limit the movement of said belt tensioner means.

BRIEF DESCRIPTION OF THE DRAWINGS

In order that the invention may be more readily understood and put into practical effect, reference will be made to the accompanying drawings wherein:

FIG. 1 is a schematic representation of a preferred winch assembly according to the invention.

FIG. 2a is a torque speed curve of motor 11.

DETAILED DESCRIPTION OF PREFERRED EMBODIMENTS OF THE INVENTION

Figure 2:
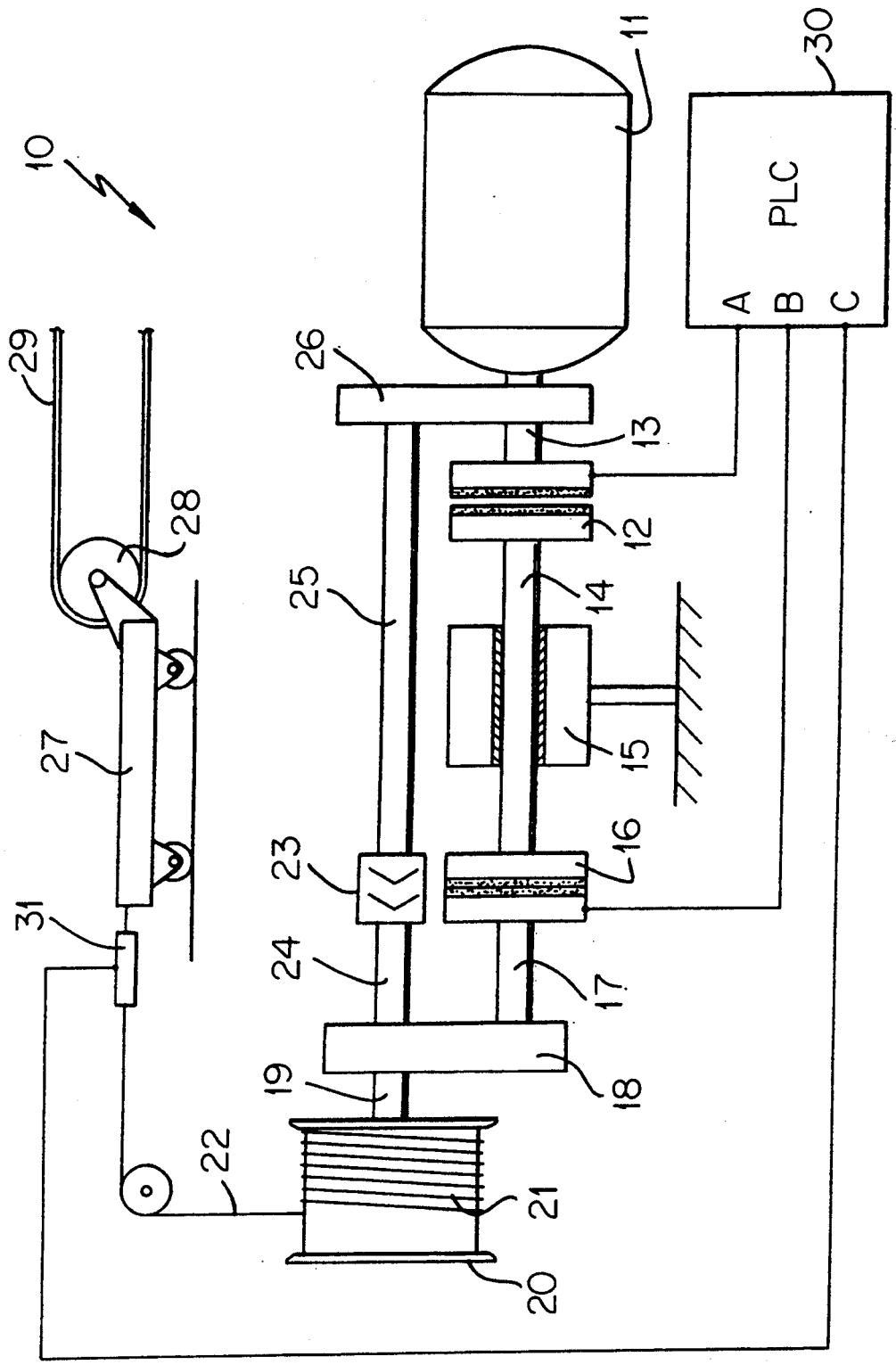
FIG. 2 is a schematic representation of a winch assembly according to a second embodiment of the invention.

The winch assembly of FIG. 1 has an electric motor 11 rotatably connected to a first or engaging clutch 12 by a motor driven shaft 13. The engaging clutch 12 is connected to an intermediate shaft 14 which is biased to rotate in a one-way direction by a constantly engaged one-way brake 15. The intermediate shaft 14 is connected at its end remote from engaging clutch 12 to a second or disengaging clutch 16 such that rotation of the engaging clutch 12 by the motor 11 in the one-way direction determined by the one-way brake 15 will, through intermediate shaft 14, cause rotation of the disengaging clutch 16. The disengaging clutch 16 is rotatably connected by a gear drive shaft 17 to a gear train 18 which, in turn, is rotatably connected by a winch drum shaft 19 to a winch drum 20.

A cable 21 is wound around the drum and has an unwound portion 22 secured to a load (not shown). The tension of the unwound portion 22 is controlled by a tension control means (not shown).

The motor driven shaft 13 can rotate in one direction only as dictated by the motor 11 and must be in the same direction as that for the intermediate shaft 14 dictated by the one-way brake 15.

In order to reel in cable around the winch drum, the motor 11 is activated, engaging clutch 12 is engaged and the disengaging clutch 16 is engaged.

The motor driven shaft 13, the intermediate shaft 14, the gear drive shaft 17 and the winch drum shaft 19 become rotatably connected so as to cause motor driven reeling in of cable 21. The gear train 18 changes the rotational speed of the combined shafts 13, 14 and 17 dictated by the motor 11 to provide a winch drum rotational speed appropriate to the required reel in speed of the cable.

During this reel in operation, the tension control means continuously monitors the increasing tension in the unwound cable portion 22.

When the tension control means monitors the desired tension, the engaging clutch 12 is disengaged.

The one-way brake 15 prevents the intermediate shaft 14 and ultimately the winch drum 20 from rotating in the opposite direction, thereby holding the cable wound on the winch drum at the desired tension and restricting the winch drum from paying out cable under the influence of cable tension.

If the tension control means monitors a cable tension higher than the desired tension, the disengaging clutch 16 is disengaged which allows the cable tension to rotate the winch drum 20 and gear train 18 in a direction opposite to that for reeling in of cable, thereby allowing the winch drum 20 to pay out cable.

During this paying out operation, the tension control means continuously monitors the decreasing tension in the unwound cable portion 22.

When the tension control means monitors the desired tension, the disengaging clutch is engaged, and, as mentioned above, the one-way brake 15 restricts the winch drum 20 from further rotation in the opposite direction, thereby restricting the winch drum 20 from paying out further cable.

Where the engaging clutch 12 is hydraulically, electrically or pneumatically engaged and the disengaging clutch 16 is spring engaged, an advantage of the preferred embodiment of the present invention is that, if there is a power failure during the maintaining of the desired tension, the disengaging clutch 16 remains engaged, thereby not allowing any loss of cable tension, and the engaging clutch 12 becomes disengaged, thereby preventing any inertia stored in the motor 11 from translating through the combined shafts to the winch drum 20 during the power failure.

With reference to FIG. 2 a second embodiment of the invention is shown in schematic form wherein like numbers represent the same components as in respect of the first embodiment illustrated in FIG. 1.

The additional components of the drive train as illustrated in FIG. 2 include an overrun clutch 23 rotatably connected by a first overrun shaft to gear train 18 (which, in turn, remains connected to winch drum shaft 19). The output side of overrun clutch 23 is rotatably connected by second overrun shaft 25 to second gear train 26 which rotatably connects second overrun shaft 25 to motor shaft drive 13.

The function of overrun clutch 23 is to rotatably engage second overrun shaft 25 to first overrun shaft 24 when first overrun shaft 24 exceeds a predetermined overspeed rotational velocity, thereby directly connecting winch drum shaft 19 to the motor drive shaft 13.

In this embodiment electric motor 11 is a three phase squirrel cage induction motor having a torque speed curve of the type characteristic of such motors as illustrated in FIG. 2a.

As is indicated by the torque speed curve the motor 11 will seek to resist having its motor drive shaft 13 rotate above its synchronous speed with a torque value which varies with the overspeed/slip value relative to synchronous speed/slip. Provided the motor 11 is appropriately rated and geared to cope with the maximum torque which can be exerted upon winch drum 20 then the motor will act to limit the rotational velocity of motor drive shaft 13 to around the synchronous speed of the motor under overrun conditions when overrun clutch 23 is engaged.

Figure 4:
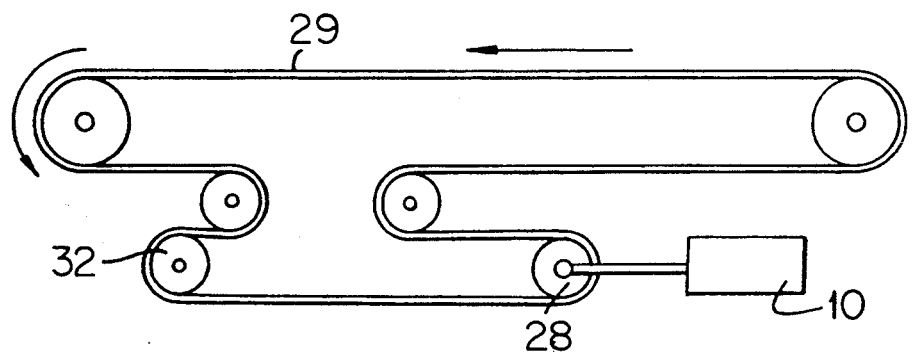
FIG. 4 is a section of a conveyor belt tensioning system according to the second embodiment.

The assembly of the second embodiment has particular use as a tension controller for large conveyor belts (refer side section view of conveyor belt in FIG. 4).

As illustrated in FIG. 2 when used for this purpose, cable 22 is connected to tension carriage 27 which rotatably supports conveyor belt idler pulley 28 having a portion of conveyor belt 29 wound thearearound.

Figure 3A:
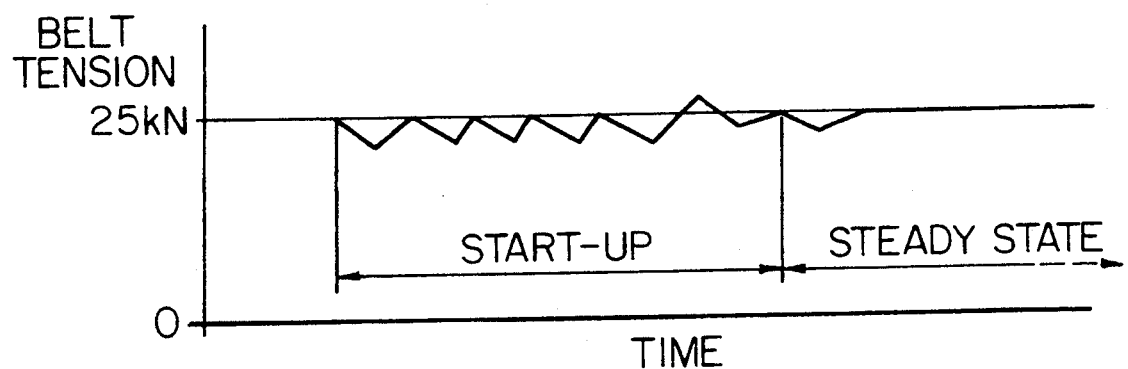
FIG. 3 illustrates a preferred manner of usage and behaviour of the winch assembly of FIG. 2 as a conveyor belt tensioning control device.
Figure 3B:
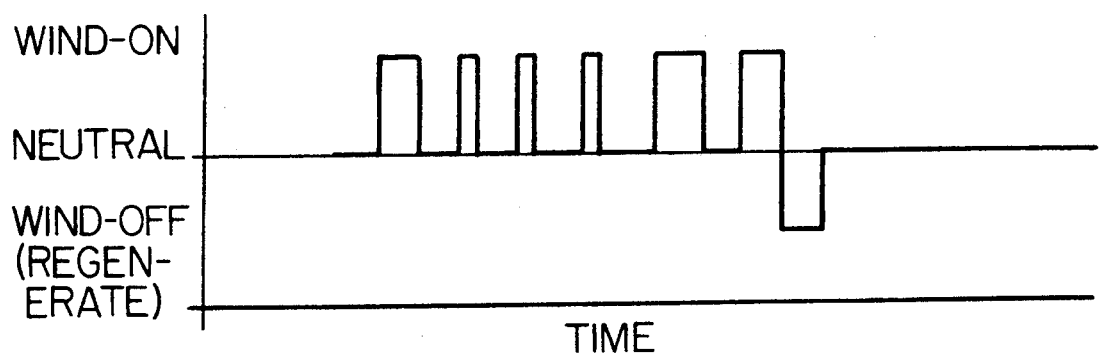

The carriage 27 and pulley 28 are of conventional design as known in the art of tensioning arrangements for large conveyor belts arranged in the manner illustrated in FIG. 3.

The winch assembly of FIG. 2 is utilised to maintain the tension of conveyor belt 29 within a predetermined range during all operational phases of the belt 29 (e.g. startup, shutdown, running empty, running full, running intermittently loaded) in the following manner.

A programmable logic controller (PLC) 30 controls the engagement/disengagement of clutch 12 by means of output A. It controls the disengagement/engagement of clutch 16 by means of output B. It receives information as to the current tension in belt 29 from analog input C connected to load cell 31.

In use three phase squirrel cage induction motor 11 is connected directly to the mains and left running. If PLC 30 determines that belt 29 is overtensioned as indicated by input C from load cell 31 then a payout phase is commenced simply by disengaging clutch 16 via output B and allowing winch 20 to payout cable 22. The rate of payout is limited to approximately the synchronous speed of the induction motor 11 by the engagement of overrun clutch 23 as previously described.

If PLC 30 senses that conveyor belt 29 is undertensioned as indicated at input C reflecting the value of load cell 31 then a wind in operation is commenced simply by engaging clutch 16 via output B.

In the steady state—that is when the load cell indicator set point tension—overrun clutch 23 and clutch 12 are disengaged whilst clutch 16 is engaged whereby tension is maintained on cable 22 by the resisting action of one way brake 15.

With reference to the graphs in FIG. 3 it can be seen that the tensioning control system thus effected of conveyor belt 29 is a simple on/off arrangement essentially controlled entirely with reference to the tension of belt 29 as reflected at input C and by the condition of clutch 16 (whether engaged or disengaged as controlled by output B).

Whilst the control arrangement is simple and has a short time constant (of the order of 0.2–0.5 seconds is achievable with conventional programmable controllers and clutch components) it can achieve close control of the tension in belt 29 under all expected operational conditions.

Graph 1 in FIG. 3 illustrates the actual tension condition in conveyor belt 29 as it accelerates from rest up to operational speed with the conveyor belt tensioning arrangement illustrated in FIG. 2 operational. It can be seen that the conveyor belt tension value oscillates within a close band about a value of 25 kN.

Graph 2 in FIG. 3 shows the actions of the winch assembly of FIG. 2 to achieve that control, namely relatively short wind on periods to counteract the lowering of tension in the conveyor belt on the feed out side of conveyor drive pulley 32 during acceleration from rest followed by short bursts of payout (when induction motor 11 goes into a regenerate mode as and when overrun clutch 23 engages) so as to limit overshoot of tension as the conveyor belt 29 comes up to operational speed.

Typical components to achieve the 25 kN tension level in belt 29 would include the following:
  motor 11: equirrel cage induction motor 30 kW
    engaging clutch 12: normally disengaged—0.2 second pull in and disengagement time.
    disengaging clutch 16: normally engaged 0.2 second pull in and disengagement time
    overrun clutch 23: normally disengaged engagement/disengagement time 0.2 seconds
  PLC 30: manufacturer Siemens—maximum response time 0.5 seconds.

Accordingly it can be seen that the electrical and mechanical efficiency of the winch assembly 10 is relatively high thereby ensuring relatively little heat dissipation whilst the time constant of the resulting system is more than adequate to control the tension within a large conveyor belt 29 to within relatively close tolerances.

The winch assembly 10 of the second embodiment may be retro-fitted to existing tension carriages 27 to replace longer time constant/less adequate control mechanisms.

Various modifications may be made in details of design and construction without departing from the scope or ambit of the invention.

I claim:

1. A winch assembly comprising:

a winch drum having a winding cable attached to said drum in such a manner as to increase tension in said winding cable when wound on said drum and decrease tension in said cable when said cable is unwound from said drum;

drive means for rotating said drum, said drive means including, in series, a motor rotatably connected to a first clutch which when engaged causes said drive means to wind said cable onto said drum, said first clutch being rotatably connected to a constantly engaged one-way brake, said one-way brake preventing paying out of said cable and being rotatably connected to a second clutch which when disengaged allows said drive means to unwind said cable off said drum, said second clutch being rotatably connected to said winch drum, tension control means for monitoring tension in an unwound portion of said cable, engaging said first clutch so that said drive means rotates said drum for winding said cable to a desired tension when said tension control means monitors a tension below said desired tension in said unwound portion of said cable and, disengaging said second clutch which in turn unwinds said cable until a desired tension is reached when said tension control means monitors a tension above said desired tension in said unwound portion of said cable.

2. The winch assembly of claim 1 wherein said constantly engaged one-way clutch comprises clutching means selected from the group consisting of sprag type clutches, ramp and roller type clutches and cam clutches.

3. The winch assembly of claim 1 wherein said tension control means comprises an electronically operated controller including an electronic sensor for monitoring cable tension, a programmable data reference bank for comparing monitored tension with said desired tension, and electronically driven actuators for causing said first clutch to engage and said second clutch to disengage.

4. The winch assembly of claim 1 further including an overrun clutch rotatably connecting said drum to said motor in parallel with said first clutch, said one-way clutch and said second clutch; whereby the speed of said drum when said second clutch is disengaged is controlled by the torque/speed characteristic of said motor; said overrun clutch adapted to engage at a predetermined speed of said drum.

5. The winch assembly of claim 4 wherein said motor is a squirrel cage induction motor.

6. The winch assembly of claim 1 wherein said first clutch is hydraulically engaged and is disengaged by a spring release mechanism.

7. The winch assembly of claim 1 wherein said first clutch is electrically engaged and is disengaged by a spring release mechanism.

8. The winch assembly of claim 1 wherein said first clutch is pneumatically engaged and is disengaged by a spring release mechanism.

9. The winch assembly of claim 1 wherein said second clutch is engaged by a spring engaging mechanism and is disengaged hydraulically.

10. The winch assembly of claim 1 wherein said second clutch is engaged by a spring engaging mechanism and is disengaged electrically.

11. The winch assembly of claim 1 wherein said second clutch is engaged by a spring engaging mechanism and is disengaged pneumatically.

* * * * *